H. J. SMITH.
BINDING AND SUSPENDING DEVICE.
APPLICATION FILED FEB. 24, 1920.
1,359,117.  Patented Nov. 16, 1920.
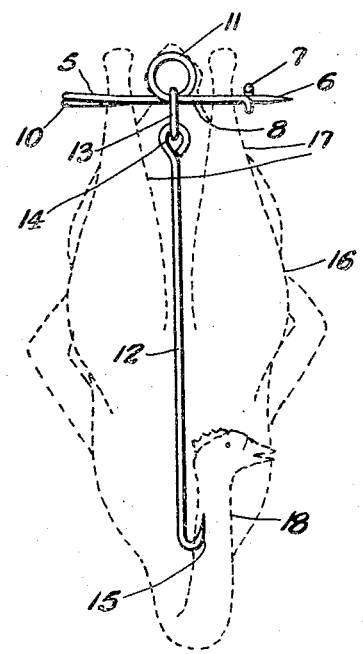
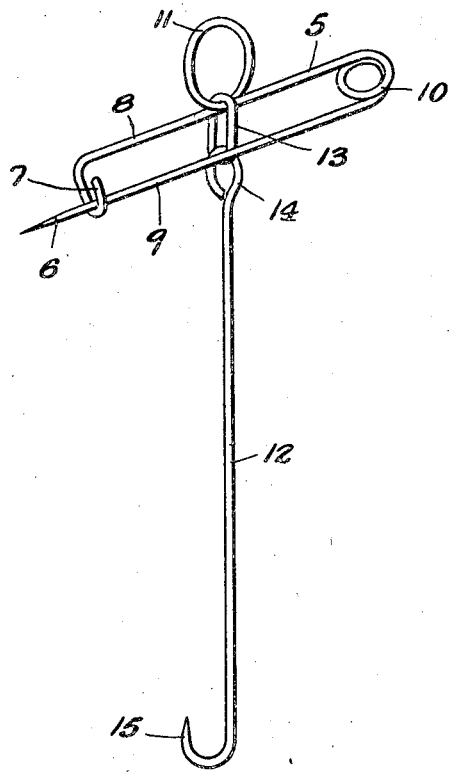
Inventor
Harry J. Smith
By his Attorneys
Edgar Tate & Co.

UNITED STATES PATENT OFFICE.

HARRY J. SMITH, OF BROOKLYN, NEW YORK, ASSIGNOR OF ONE-HALF TO JOSEPH D. DODGE, OF BROOKLYN, NEW YORK.

BINDING AND SUSPENDING DEVICE.

1,359,117.      Specification of Letters Patent.      Patented Nov. 16, 1920.

Application filed February 24, 1920. Serial No. 360,566.

*To all whom it may concern:*

Be it known that I, HARRY J. SMITH, a citizen of the United States, and residing at Brooklyn, in the county of Kings and State of New York, have invented certain new and useful Improvements in Binding and Suspending Devices, of which the following is a specification, such as will enable those skilled in the art to which it appertains to make and use the same.

This invention relates to devices for use in binding poultry and other fowl as well as meats of various kinds and classes for the purpose of holding the same together, while on display, and the object of the invention is to provide a device of the class and for the purpose specified which, in addition, to serving as a binding device also serves as a suspending device for poultry, fowl and other meats; and with this and other objects in view the invention consists in a device of the class and for the purpose specified which is simple in construction and operation and efficient in use, and constructed and operated as hereinafter described and claimed.

The invention is fully disclosed in the following specification, of which the accompanying drawing forms a part, in which the separate parts of my improvement are designated by suitable reference characters in each of the views, and in which :—

Figure 1 a side view of my improved binding and suspending device and indicating one method of its use; and, Fig. 2 a perspective view of the device detached and on an enlarged scale.

In practice, I provide a pin member 5 which is preferably fashioned from a continuous piece of heavy wire, one end of which is pointed as shown at 6, while the other end of said wire is fashioned into a hook-shaped loop 7 adapted to receive the pointed end portion 6, as clearly shown in Fig. 2. The pin member 5 comprises parallel side members 8 and 9 joined by a spring loop 10 and the side member 8 is provided centrally thereof with an upwardly directed loop 11 by means of which the pin member 5 may be suspended from a hook or other support.

A hook-shaped prong 12 is connected with the side member 8 of the pin member 5 by a link 13, which passes through the loop 11 on said side member. The prong 12 is provided at one end with a loop 14 which passes through the link 13 and the free end portion of the prong 12 is fashioned into a hook-shaped pointed member 15.

My improved binding and suspending device is preferably designed for use in binding poultry and fowl for holding the same in proper position, while on display, and also to facilitate the suspending of the same, but said device may also be used for binding and suspending other meat products, if desired. In the accompanying drawing I have indicated at 16 a fowl and the method of connecting my improved device therewith. The pin member 5, or the pointed end portion 6 thereof is passed through the outer end portion of the legs 16 of the fowl, and the prong 12 is connected with the neck portion 18 of the fowl when in a raised position, as indicated in Fig. 1. It will, therefore, be seen that by means of my improved device the fowl 16 may be placed on display on a counter or in a suitable show case, or may be suspended from a hook or other support by means of the loop 11, and when so suspended the fowl will assume a neat and compact form, and by reason of the method of suspending the neck and head portion of the fowl in an upright position the blood which usually drips therefrom, in the present method of suspending fowl, will be obviated.

It will be apparent that while I have shown and described a particular use of my improved binding or suspending device, I am not necessarily limited to this use, nor to the specific construction of the device, and various changes in and modifications of the device as herein shown and described may be made, within the scope of the appended claims, without departing from the spirit of my invention or sacrificing its advantages.

Having fully described my invention, what I claim as new and desire to secure by Letters Patent, is :—

1. A binding and suspending device of the class described comprising a pin member composed of a single piece of heavy wire fashioned to form parallel side members joined at one end by a spring loop, the free end of one of said side members being pointed and the free end of the other side member being provided with a hook-shaped loop adapted to receive the pointed end of the other side member, one of said side members being provided centrally thereof with an upwardly directed loop, and a prong member loosely connected with one of the side members of said pin member.

2. A binding and suspending device of the class described comprising a pin member composed of a single piece of heavy wire fashioned to form parallel side members joined at one end by a spring loop, the free end of one of said side members being pointed and the free end of the other side member being provided with a hook-shaped loop adapted to receive the pointed end of the other side member, one of said side members being provided centrally thereof with an upwardly directed loop, a prong member provided at one end with a loop and at the other end with a pointed hook-shaped member, and a link passed through the loop of said prong member and the upwardly directed loop on said pin member.

3. A binding and suspending device for fowl and the like comprising a pin member, and a prong member, said pin member being provided with a suspending loop formed integrally therewith and a link for connecting said prong member with the suspending loop of said pin member, substantially as shown and described.

In testimony that I claim the foregoing as my invention I have signed my name in presence of the subscribing witnesses this 17th day of February 1920.

HARRY J. SMITH.

Witnesses:
C. E. MULREANY,
H. E. THOMPSON.